United States Patent [19]

Siegel

[11] Patent Number: 5,063,608
[45] Date of Patent: Nov. 5, 1991

[54] ADAPTIVE ZONAL CODER

[75] Inventor: Shepard L. Siegel, Derry, N.H.

[73] Assignee: Datacube Inc., Peabody, Mass.

[21] Appl. No.: 431,548

[22] Filed: Nov. 3, 1989

[51] Int. Cl.$^5$ .............................................. G06K 9/00
[52] U.S. Cl. ...................................... 382/56; 383/50; 358/133
[58] Field of Search ....................... 382/56, 49, 27, 50, 382/52; 358/133, 261.1, 261.3, 432, 135, 136

[56] References Cited

U.S. PATENT DOCUMENTS

| | | | |
|---|---|---|---|
| 4,012,715 | 3/1977 | Essenmacher | 382/52 |
| 4,032,775 | 11/1981 | Widergren et al. | 358/136 |
| 4,442,454 | 4/1984 | Powell | 358/167 |
| 4,553,165 | 11/1985 | Bayer | 358/167 |
| 4,725,885 | 2/1988 | Gonzales et al. | 358/135 |
| 4,774,574 | 9/1988 | Daly et al. | 358/133 |
| 4,780,761 | 10/1988 | Daly et al. | 358/133 |
| 4,807,029 | 2/1989 | Tanaka | 358/133 |
| 4,821,119 | 4/1989 | Gharavi | 358/136 |
| 4,860,217 | 8/1989 | Sasaki et al. | 364/518 |
| 4,861,112 | 8/1989 | Nichols et al. | 358/400 |
| 4,894,713 | 1/1990 | Delogne et al. | 358/133 |
| 4,908,862 | 3/1990 | Kaneko et al. | 358/135 |

Primary Examiner—Michael Razavi
Assistant Examiner—Yon Jung
Attorney, Agent, or Firm—Weingarten, Schurgin, Gagnebin & Hayes

[57] ABSTRACT

The invention provides a method and apparatus for performing image data compression. Initially, a two-dimensional block of image data in a spatial domain is transformed by a transform coder, resulting in a two-dimensional array of activity coefficients in a frequency domain. The array is then serialized and quantized, yielding a one-dimensional array of coefficients with a leading coefficient and an original trailing coefficient. Next, a portion of the array is selected by choosing a new trailing coefficient based on a setable ratio of the energy of the new short array to the energy of the original array. Lastly, an end-of-block symbol is appended after the new trailing coefficient, and the selected portion of the array is encoded using an entropy coder. The invention allows image data to enjoy enhanced compression with good image fidelity, and allows image fidelity to degrade gracefully in trade for higher degrees of image compression.

9 Claims, 2 Drawing Sheets

ADAPTIVE ZONAL CODER

FIELD OF THE INVENTION

This invention relates to image data compression and more particularly to adaptive techniques for transform coding of image data for transmission or storage.

BACKGROUND OF THE INVENTION

Many communication systems require the transmission and/or storage of image data. Any technique that minimizes the amount of information required to encode a given image is highly desireable. Transform coding represents a major class of such methods. Meaningful images usually contain a high degree of long-range structure, i.e., they have high inter-element correlations. In transform coding, an image with high inter-element correlations is converted into a collection of uncorrelated coefficients, thereby removing most of the redundant information in the original image. Early transform techniques employed a Fourier-type transform. Current approaches use a discrete cosine transform (DCT) or a Hadamard transform, both of which provide relatively higher coding efficiency.

Commonly, an image to be encoded is partitioned into a plurality of image blocks, and each block is divided into an 8×8 or 16×16 square array. The resulting blocks are encoded one after another. A typical image compression pipeline includes a transform coder, a quantizer, and an entropy coder. A quantizer is used to map a coefficient, falling within a range of continuous values, into a member of a set of discrete quantized values, and an entropy coder uses statistical properties of the information to compress it, i.e., to express the same message using fewer binary digits. For example, a Huffman coder relates the most frequent incoming data symbols to the shortest outgoing codes, and the least frequent incoming data symbols to the longest outgoing codes. After the transform coder transforms an image block into a collection of uncorrelated coefficients, the quantizer provides the corresponding series of discrete values to the entropy coder. The resulting stream of binary digits is then either transmitted or stored.

Although it is possible to retain all the coefficients that result from transform coding an image, it is neither necessary nor desirable. Due to the nature of the human visual system, certain coefficients can be omitted without degrading perceived image quality. By retaining only visually important coefficients, an image with acceptable fidelity can be recovered using significantly less information than provided by the transform coding process.

For a typical two-dimensional source image, the transform operation results in a redistribution of image energy into a set of relatively few low-order coefficients that can be arranged in a two-dimensional array. Visually significant coefficients are usually found in the upper left-hand corner of the array.

According to a known method, referred to as 'zonal coding', only those coefficients lying within a specified zone of the array, e.g., the upper left quarter of the array, are retained. Although significant data compression can be achieved using this method, it is inadequate because picture fidelity is reduced for scenes that contain significant high frequency components.

In an alternative approach, referred to as 'adaptive transform coding', a block activity measure is used to choose an optimum quantizer. Although this method achieves gains in efficiency by providing a degree of quantization precision appropriate to the activity level of a given block, the additional information needed to specify the state of the quantizer must be transmitted along with the usual coefficient data.

SUMMARY OF THE INVENTION

The invention provides a method for image data compression that includes the following steps: transforming a two-dimensional block of image data in a spatial domain to data in a frequency domain. The transformed image data is represented as a two-dimensional array of activity coefficients. The two dimensional array is then serialized, resulting in a one-dimensional array of coefficients with a leading coefficient and an original trailing coefficient. The array is then quantized. Next, a portion of the array is selected beginning with the leading coefficient and ending with a new trailing coefficient that is closer to the leading coefficient than the original trailing coefficient. Lastly, an end-of-block symbol is appended after said new trailing coefficient, and the selected portion of the array is encoded using an entropy coder.

In a preferred embodiment, the portion is selected by first measuring the total activity of the array. A measure of activity of successive sub-portions of the array is determined on-the-fly, and added to a running total. Each new value of the running total is compared to the total activity of the array. Based on this comparison, and in a further preferred embodiment, on a setable level of image quality, a new trailing coefficient is designated, and only the portion of the array bounded by the leading coefficient and the new trailing coefficient is presented for encoding.

Another general feature of the invention is apparatus for inclusion in an image data compression pipeline, the pipeline including a transform coder, a serializer, a quantizer and an entropy coder. The apparatus includes a memory connected to said quantizer and said entropy coder. The memory has an input and an output adapted to store and delay at least a block of transformed, serialized and quantized image data, and is adapted to provide an entropy coder with successive sub-portions of said block of image data. The apparatus also includes a first measurer connected to the quantizer for measuring the total activity of the block of image data, and a second measurer connected to the output of the memory for measuring the activity of successive sub-portions of the image data and computing a running total of the activity. A control law unit is connected to the first and second measurers, and to an entropy coder, and is adapted to compare the running total provided by the second measurer to a level based in part on the total activity provided by the first measurer, and sends an end-of-block symbol to the entropy encoder. The entropy coder is adapted to encode only a portion of the block of image data based on when it receives an end-of-block symbol.

Thus, it is not necessary to transmit additional information along with each block for indicating, e.g., its activity level, or run length. The end-of-block symbol provides an image data receiver with sufficient information for parsing an incoming bit stream back into blocks of image data.

BRIEF DESCRIPTION OF THE DRAWINGS

The invention will be more fully understood by reading the following detailed description, in conjunction with the accompanying drawings, in which.

DETAILED DESCRIPTION OF THE INVENTION

Figure 1:
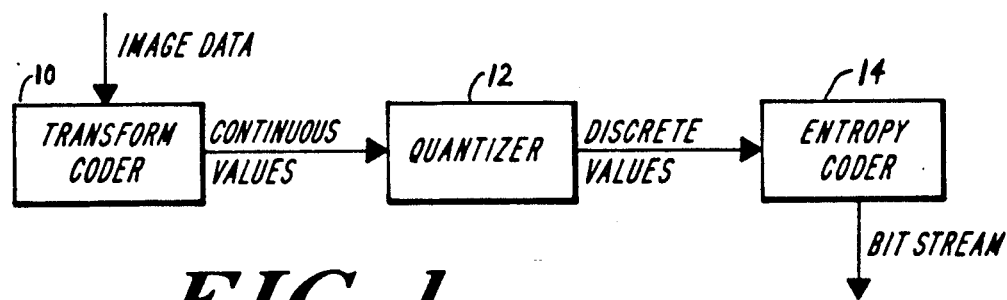
FIG. 1 is a block diagram of a typical image compression pipeline.

With reference to FIG. 1, a typical image compression pipeline includes a transform coder 10, such as a discrete cosine transform coder (DCT), as disclosed in Ahmed et al., "Discrete Cosine Transform", IEEE Trans on Computers, Jan 1974, pp 90–93; a quantizer 12, such as a linear quantizer, as described in Wintz, "Transform Picture Coding", section III, Proc. IEEE, vol. 60, pp 809–820; and an entropy coder 14, such as a Huffman coder, as discussed in Huffman, "A Method for the Construction of Minimum-Redundancy Codes", Proc. IRE 40, No. 9, 1098–1101. After the transform coder 10 transforms image data into a collection of uncorrelated coefficients, the quantizer 12 maps each coefficient, selected from a range of continuous values, into a member of a set of discrete quantized values. These quantized values are then encoded by the entropy coder 14. The resulting stream of binary digits is then either transmitted or stored.

Figure 2A:
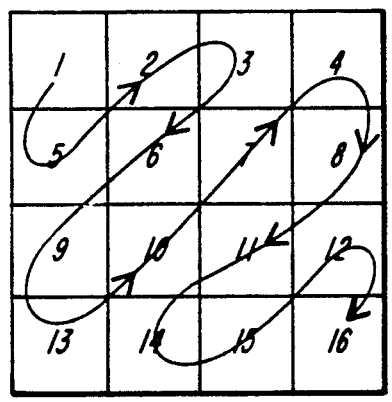
FIG. 2A is a representation of a 4×4 array of coefficients.
Figure 2B:
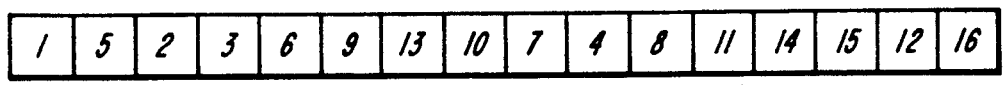
FIG. 2B is a representation of a 1×16 array of coefficients corresponding to the array of FIG. 2A.

Typically, image data is two-dimensional. Accordingly, the information provided by the transform coder 10 is presented in the form of a two-dimensional array. In a preferred embodiment, a serializer, such as a zigzag serializer, is used to covert the two-dimensional array of continuous values into a one-dimensional array of continuous values. The one-dimensional array is then quantized to yield a one-dimensional array of discrete values. For example, a zigzag serializer operating on an 4×4 array of integers as shown in FIG. 2A would produce a 1×16 array of integers as shown in FIG. 2B.

Figure 3:
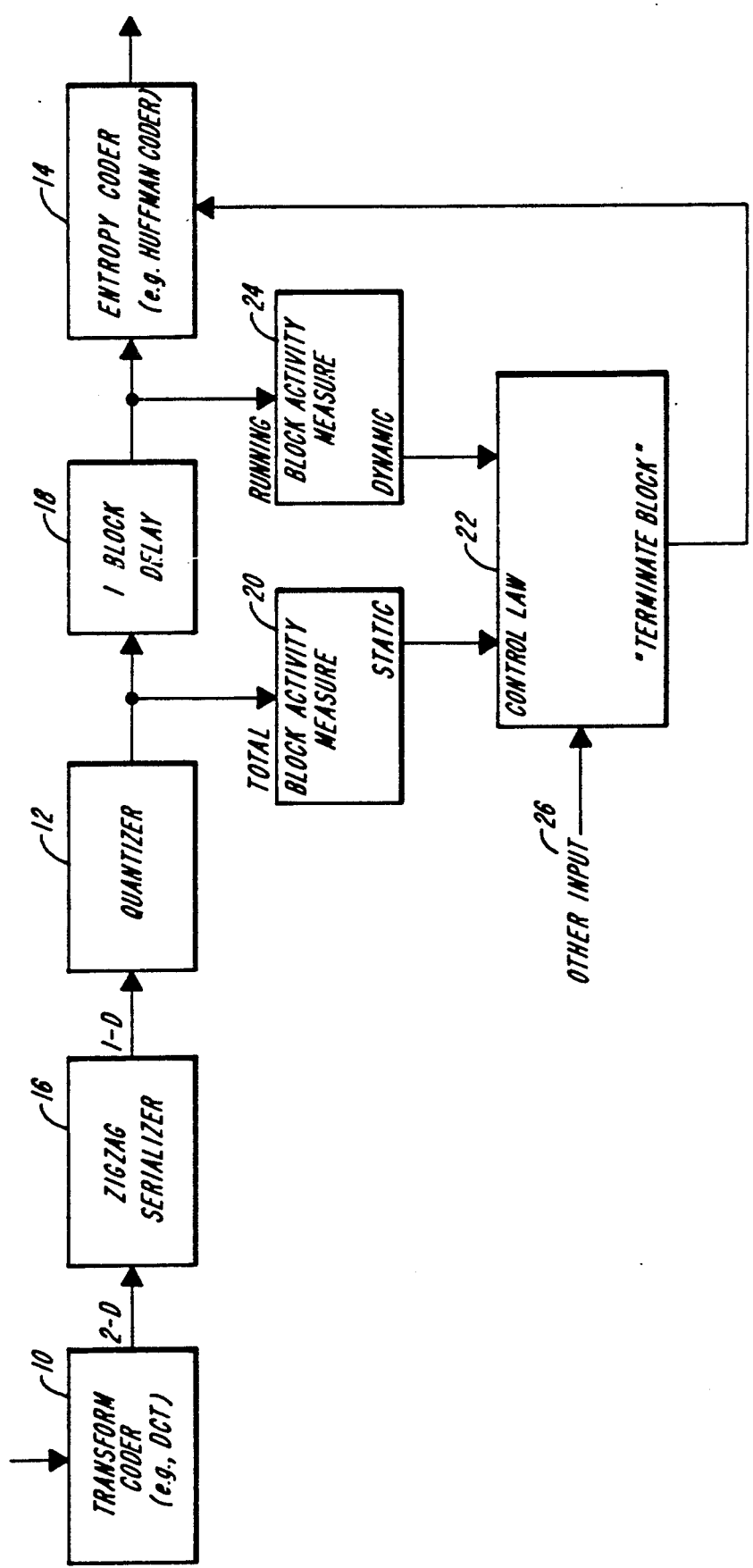
FIG. 3 is a block diagram of the image compression system of the invention.

In a preferred embodiment, a zigzag serializer 16 is included in the image compression pipeline between the transform coder 10 and the quantizer 12, as shown in FIG. 3. After serializing the two-dimensional array provided by the transform coder 10, the quantizer maps the resulting one-dimensional array of continuous values into a one-dimensional array of quantized values. The array is then held for one block processing interval in a one-block delay memory unit 18, while an identical copy of the array is measured by a total block activity measure module 20. The module 20 computes the summation of the square (or the absolute value) of each element in the one-dimensional array, providing a value that represents the 'activity' or 'energy' of the image represented by the array to a control law module 22.

Figure 2C:
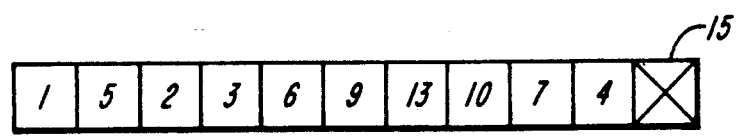
FIG. 2C is a representation of a truncated array of coefficients corresponding to the array of FIG. 2B with an appended end-of-block symbol.

The zigzag serializer 16 places the low-order coefficients that result from, for example, a discrete cosine transform, at the beginning of an array, and the higher-order terms at the end. If there are sufficient low-order terms, the higher-order terms are of less importance and, due to the nature of the human visual response, may be omitted without perceived image degradation. For example, FIG. 2C shows the one-dimensional array of FIG. 2B after truncation of its six highest order coefficients. Since it is common for the activity of a block to be found mostly in its lower-order coefficients, transmitting only these coefficients results in substantially greater compression of image data. However, unlike the known case of non-adaptive zonal coding, a block with significant activity in its higher-order coefficients will be transmitted in a manner that allows most of these coefficients to be included in the transmitted block, resulting in a received image of superior fidelity. Furthermore, it is not necessary to transmit additional information along with each block for indicating, e.g., its activity level. Instead, the end-of-block symbol 15 allows an image data receiver to know how to parse an incoming bit stream back into blocks of image data.

After dwelling in the memory unit 18 for one processing interval, the one dimensional array is again measured for activity. A running block activity measure module 24 computes a running total of the squares or the absolute values of the elements in the array as it enters the module 24. A new value of the running total is provided to the control law module 22 as each additional element of the array enters the module 24. Also, as each element of the array enters the module 24, an identical element enters the entropy coder 14. The newly arriving array elements are held in a memory register within the entropy coder 14 until a terminate-block signal, representing an end-of-block character, is provided by the control law module 22. A terminate-block signal may be generated after an entire array has entered the entropy encoder 14. Alternatively, the control law module may generate a terminate-block signal after a predetermined amount of activity has been measured by module 24. In this case, even if the entire array has not yet entered the entropy coder 14, the resulting partial array is transmitted, with an end-of-block symbol appended at the end of the partial array.

The control law module 22 compares the total block activity of the current array, provided by module 20, with the running block activity measure, such as the running sum of squares or absolute values that is progressively generated by the module 24. In a preferred embodiment, a ratio or difference circuit is included in the control law module 22 to generate a measure of the percentage of current block activity. The comparison of the total block activity measure with the running block activity measure indicates how much 'activity' has entered the entropy coder 14. A desired level of image fidelity can be set using an additional input 26.

For a given level, the number of coefficients transmitted will vary, depending on the distribution of activity among the low, middle, and high order coefficients. If the activity of the block is concentrated in its lower order terms, it will be necessary to send fewer coefficients than if a large fraction of the blocks activity is found in the higher order coefficients. If the channel used for transmission becomes overloaded, image fidelity can be decreased in trade for increased data compression.

The image data compression method of the invention can be used to encode any grayscale image or representation of the difference between two images.

Other modifications and implementations will occur to those skilled in the art without departing from the spirit and the scope of the invention as claimed. Accordingly, the above description is not intended to limit the invention except as indicated in the following claims.

What is claimed is:

1. A method for image data compression comprising the steps of:
   transforming a two-dimensional block of image data in a spatial domain to resulting data in a frequency domain represented as a two-dimensional array of activity coefficients;
   serializing said entire two-dimensional array of coefficients, yielding a one-dimensional array of coefficients with a leading coefficient and an original trailing coefficient;
   quantizing said one-dimensional array of coefficients;
   selecting a portion of said one-dimensional array of coefficients beginning with said leading coefficient and ending with a new trailing coefficient that is closer to the leading coefficient than said original trailing coefficient, wherein said portion is selected by a process comprising the steps of:
      obtaining a measure of total activity of said one-dimensional array of coefficients,
      determining in real time a measure of activity of successive sub-portions of said one-dimensional array, and adding said measure of activity to a running total,
      performing a comparison in real time of said running total to a setable level based on said measure of total activity, and
      designating a new trailing coefficient according to said comparison;
   appending an end-of-block symbol after said new trailing coefficient; and
   encoding only said portion with an entropy coder.

2. The method of claim 1, wherein said sub-portions are single coefficients.

3. The method of claim 1, wherein said setable level is also based on a degree of desired image quality.

4. Apparatus for image data compression comprising:
   a transform coder for transforming a two-dimensional block of image data in a spatial domain to resulting data in a frequency domain represented as a two-dimensional array of activity coefficients;
   a serializer for serializing said entire two-dimensional array of coefficients, yielding a one-dimensional array of coefficients with a leading coefficient and an original trailing coefficient;
   a quantizer for quantizing said one-dimensional array of coefficients;
   a selector for selecting a portion of said one-dimensional array of coefficients beginning with said leading coefficient and ending with a new trailing coefficient that is closer to the leading coefficient than said original trailing coefficient, said selector including:
      a measurer for measuring total activity of said one-dimensional array of coefficients,
      a measurer for obtaining a measure of activity in real time of successive sub-portions of said one-dimensional array, and for adding said measure of activity to a running total,
      a comparer for performing a comparison in real time of said running total to a setable level based on said measure of total activity, and
      a designator for designating a new trailing coefficient according to said comparison;
   an appendor for appending an end-of-block symbol after said new trailing coefficient; and
   an entropy encoder for encoding only said portion.

5. The apparatus of claim 4, wherein said sub-portions are single coefficients.

6. Apparatus for inclusion in an image data compression pipeline that includes a transform coder, a serializer, a quantizer and an entropy coder comprising:
   a memory connected to said quantizer and said entropy coder with an input and an output adapted to store and delay at least a block of transformed, serialized and quantized image data, and adapted to provide an entropy coder with successive sub-portions of said block of image data;
   a first measurer connected to said quantizer for measuring the total activity of said block of image data;
   a second measurer connected to said output of said memory for measuring the activity of successive sub-portions of said image data and computing a running total of said activity;
   a control law unit connected to the first and second measurers, and to an entropy coder, adapted to compare said running total provided by said second measurer to a level based in part on said total activity provided by said first measurer, and sending an end-of-block signal to said entropy encoder;
   wherein said entropy coder is adapted to encode only a portion of said block of image data based on when it receives an end-of-block signal.

7. A method for image data compression comprising the steps of:
   transforming a two-dimensional block of image data from a spatial domain to a frequency domain, wherein said resulting block of image data in the frequency domain is represented by a two-dimensional array of activity coefficients;
   serializing said entire two-dimensional array of coefficients, yielding a one-dimensional array of coefficients;
   quantizing said one-dimensional array of coefficients;
   selecting a visually significant portion of said one-dimensional array of coefficients, said step of selecting including the steps of:
      obtaining a measure of total activity of the one-dimensional array of coefficients,
      determining in real time a running total of the activity of successive portions of said one-dimensional array as they enter the entropy coder,
      performing in real time a comparison of successive values of said running total to a setable level based on said measure of total activity of the one-dimensional array of coefficients, and
      demarking a trailing end of said one-dimensional array according to said comparison;
   appending a symbol at a trailing end of the selected portion for indicating the end of said portion; and
   encoding said portion with an entropy coder.

8. Apparatus for use in an image processing pipeline including a transform coder, a serializer, and a quantizer, said apparatus comprising:
   first means for obtaining a measure of total activity of a two-dimensional block of image data represented as a one-dimensional array of quantized activity coefficients;
   second means for determining in real time a running total of successive activity coefficients of said one-dimensional array as said activity coefficients are received by an entropy coder;

third means connected to said first means, said second means and said entropy coder for performing a comparison of said running total to a settable level based on said measure of total activity, and for demarking an activity coefficient of said one-dimensional array as a trailing end of said one-dimensional array according to said comparison.

9. The apparatus of claim 8, further comprising memory means connected to said entropy encoder for allowing a block of image data to dwell momentarily while said first means measures its total activity.

* * * * *